United States Patent
Zhang et al.

(10) Patent No.: US 11,372,275 B2
(45) Date of Patent: Jun. 28, 2022

(54) DISPLAY PANEL AND MANUFACTURING METHOD THEREOF

(71) Applicants: BEIJING BOE OPTOELECTRONICS TECHNOLOGY CO., LTD., Beijing (CN); BOE TECHNOLOGY GROUP CO., LTD, Beijing (CN)

(72) Inventors: Lei Zhang, Beijing (CN); Pengju Hu, Beijing (CN); Xiaofeng Zhang, Beijing (CN); Changquan Wang, Beijing (CN)

(73) Assignees: BEIJING BOE OPTOELECTRONICS TECHNOLOGY CO., LTD., Beijing (CN); BOE TECHNOLOGY GROUP CO., LTD., Beijing (CN)

( * ) Notice: Subject to any disclaimer, the term of this patent is extended or adjusted under 35 U.S.C. 154(b) by 670 days.

(21) Appl. No.: 16/327,534

(22) PCT Filed: Aug. 31, 2018

(86) PCT No.: PCT/CN2018/103605
§ 371 (c)(1),
(2) Date: Feb. 22, 2019

(87) PCT Pub. No.: WO2019/062474
PCT Pub. Date: Apr. 4, 2019

(65) Prior Publication Data
US 2021/0382343 A1 Dec. 9, 2021

(30) Foreign Application Priority Data
Sep. 29, 2017 (CN) .......................... 201710912246.X

(51) Int. Cl.
*G02F 1/1333* (2006.01)
*G02F 1/1339* (2006.01)

(52) U.S. Cl.
CPC ...... *G02F 1/133325* (2021.01); *G02F 1/1339* (2013.01); *G02F 1/13396* (2021.01); *G02F 1/133391* (2021.01)

(58) Field of Classification Search
CPC ........... G02F 1/13396; G02F 1/133325; G02F 1/133391
See application file for complete search history.

(56) References Cited

U.S. PATENT DOCUMENTS

2011/0058137 A1 * 3/2011 Huang .................. G02F 1/1339
349/187

FOREIGN PATENT DOCUMENTS

| CN | 1996130 A | 7/2007 |
| CN | 101398571 A | 4/2009 |

(Continued)

OTHER PUBLICATIONS

International Search Report and Written Opinion dated Nov. 22, 2018.

*Primary Examiner* — Lucy P Chien
(74) *Attorney, Agent, or Firm* — Dilworth & Barrese, LLP.; Michael J. Musella, Esq.

(57) ABSTRACT

A method of manufacturing a display panel is provided. The method includes: providing a liquid crystal motherboard which includes: a first motherboard, a second motherboard, and a plurality of liquid crystal regions; coating a sealant on a peripheral region of each of the liquid crystal regions of the first motherboard; assembling the second motherboard with the first motherboard and arranging liquid crystal in each of the liquid crystal regions to obtain the liquid crystal motherboard. The coating the sealant on the peripheral region of each of the liquid crystal regions of the first motherboard includes: coating a first sealant on a peripheral region of the central liquid crystal region, and coating a second sealant on a peripheral region of each of the first liquid crystal regions, (Continued)

the first sealant is provided with a first supporting structure, the second sealant is provided with a second supporting structure.

15 Claims, 13 Drawing Sheets

(56) References Cited

FOREIGN PATENT DOCUMENTS

| | | |
|---|---|---|
| CN | 101846836 A | 9/2010 |
| CN | 104102051 A | 10/2014 |
| CN | 107479241 A | 12/2017 |
| JP | 2009229685 A | 10/2009 |

* cited by examiner assembling the second motherboard with the first motherboard and arranging liquid crystal in each of the liquid crystal regions — 5021 curing the sealant to obtain the liquid crystal motherboard — 5022

DISPLAY PANEL AND MANUFACTURING METHOD THEREOF

The present application claims the priority of the Chinese Patent Application No. 201710912246.X filed on Sep. 29, 2017, which is incorporated herein by reference as part of the disclosure of the present application.

TECHNICAL FIELD

Embodiments of the present disclosure relate to a display panel and a method of manufacturing the display panel.

BACKGROUND

A liquid crystal display panel comprises: an array substrate, an opposing substrate assembled with the array substrate, a sealant arranged at an edge region between the array substrate and the opposing substrate and configured for bonding the array substrate with the opposing substrate, and liquid crystal sealed by the sealant and provided between the array substrate and the opposing substrate.

A liquid crystal display panel is a display panel formed by cutting a liquid crystal motherboard. The liquid crystal motherboard is formed by assembling an array motherboard with an opposing motherboard. The array motherboard comprises a plurality of liquid crystal regions. In the process of manufacturing the liquid crystal display panel, firstly, the sealant is coated on a peripheral region of each of the liquid crystal regions, and then the liquid crystal is dripped into each of the liquid crystal regions, so that the liquid crystal is located in a space enclosed by the sealant, after that, the opposing motherboard and the array motherboard are assembled with each other, and the sealant is curied, and the liquid crystal motherboard is formed by bonding the opposing motherboard with the array motherboard by the sealant, finally, the liquid crystal motherboard is cut to form a plurality of liquid crystal display panels. Silicon spheres are arranged in the sealant. The silicon spheres is capable of supporting the array substrate and the opposing substrate and maintain a cell gap of the liquid crystal display panel, and sizes of the silicon spheres in the sealant coated in the peripheral regions of different liquid crystal regions are the same as one another.

SUMMARY

At least one embodiment of the present disclosure provides a method of manufacturing a display panel, and a liquid crystal motherboard comprises: a first motherboard, a second motherboard, and a plurality of liquid crystal regions arranged in a matrix on the first motherboard, the plurality of liquid crystal regions comprise first liquid crystal regions adjacent to first edges of the first motherboard and a central liquid crystal region not adjacent to any edge of the first motherboard, and the method comprises: coating a sealant on a peripheral region of each of the liquid crystal regions of the first motherboard; and assembling the second motherboard with the first motherboard and arranging liquid crystal in each of the liquid crystal regions to obtain the liquid crystal motherboard, and the coating the sealant on the peripheral region of each of the liquid crystal regions of the first motherboard comprises: coating a first sealant on a peripheral region of the central liquid crystal region, and coating a second sealant on a peripheral region of each of the first liquid crystal regions, the first sealant is provided with a first supporting structure, the second sealant is provided with a second supporting structure, and a height of the second supporting structure is larger than a height of the first supporting structure.

In at least one embodiment of the present disclosure, the plurality of liquid crystal regions further comprise second liquid crystal regions, and the second liquid crystal regions are adjacent to second edges of the first motherboard intersecting with the first edges of the first motherboard, each of the first liquid crystal regions has a first distance from itself to one of the first edges of the first motherboard, and each of the second liquid crystal regions has a second distance from itself to one of the second edges of the first motherboard; the coating the sealant on the peripheral region of each of the liquid crystal regions of the first motherboard, further comprises: in condition that the second distance is less than the first distance, coating the first sealant on a peripheral region of each of the second liquid crystal regions; in condition that the second distance is greater than or equal to the first distance, coating the second sealant on a peripheral region of each of the second liquid crystal regions.

In at least one embodiment of the present disclosure, the peripheral region of each of the first liquid crystal regions comprises first peripheral sub-regions adjacent to first edges of the first motherboard, and second peripheral sub-regions not adjacent to the first edges of the first motherboard. Coating the second sealant on the peripheral region of each of the first liquid crystal regions comprises: coating the second sealant on the first peripheral sub-region; coating the first sealant on the second peripheral sub-region.

In at least one embodiment of the present disclosure, the coating the second sealant in the first peripheral sub-region and the first sealant in the second peripheral sub-region form a closed structure.

In at least one embodiment of the present disclosure, the second sealants in the first peripheral sub-regions of all the first liquid crystal regions adjacent to the first edges are integrally formed.

In at least one embodiment of the present disclosure, a supporting structure is in shape of sphere, a height of the supporting structure is equal to a diameter of the spherical.

In at least one embodiment of the present disclosure, the supporting structure comprises at least one selected from the group consisting of a silicon sphere, a plastic sphere, and a glass fiber sphere.

In at least one embodiment of the present disclosure, a height of the supporting structure in the sealant coated on a peripheral region of the central liquid crystal region ranges from 3.6 microns to 4.4 microns; and a height of the supporting structure in the sealant coated on a peripheral region of each of the first liquid crystal regions ranges from 3.8 microns to 4.6 microns.

In at least one embodiment of the present disclosure, after the second motherboard is assembled with the first motherboard to obtain the liquid crystal motherboard, the method further comprises: cutting the liquid crystal motherboard along cutting lines of the liquid crystal motherboard to obtain a plurality of display panels, and orthographic projections of the cutting lines on the first motherboard are located between every two adjacent liquid crystal regions.

In at least one embodiment of the present disclosure, the second motherboard and the first motherboard are assembled to obtain the liquid crystal motherboard, and each of the liquid crystal regions is provided with liquid crystal, and the method further comprises: assembling the second motherboard with the first motherboard, and the liquid crystal is arranged in each of the liquid crystal regions; and curing the sealant.

In at least one embodiment of the present disclosure, the first motherboard is an array motherboard, and the second motherboard is an opposing motherboard; or, the first motherboard is an opposing motherboard, and the second motherboard is an array motherboard.

At least one embodiment of the present disclosure further provides a display panel, and a second supporting structure is arranged in a sealant on one or two sides of the display panel, a first supporting structure is arranged in a sealant of remaining sides of the display panel, and a height of the second supporting structure is larger than a height of the first supporting structure.

In at least one embodiment of the present disclosure, the first supporting structure or the second supporting structure comprises at least one selected from the group consisting of a silicon sphere, a plastic sphere, and a glass fiber sphere.

BRIEF DESCRIPTION OF THE DRAWINGS

In order to clearly illustrate the technical solution of the embodiments of the present disclosure, the drawings of the embodiments will be briefly described. It is apparent that the described drawings are only related to some embodiments of the present disclosure and thus are not limitative of the present disclosure.

DETAILED DESCRIPTION

In order to make objects, technical details and advantages of embodiments of the disclosure clear, the technical solutions of the embodiments will be described in a clearly and fully understandable way in connection with the related drawings. It is apparent that the described embodiments are just a part but not all of the embodiments of the disclosure. Based on the described embodiments herein, those skilled in the art can obtain, without any inventive work, other embodiment(s) which should be within the scope of the disclosure.

A thin film transistor liquid crystal display (TFT-LCD) comprises a liquid crystal display panel, the liquid crystal display panel comprises an array substrate and an opposing substrate which is assembled with the array substrate, and further comprises liquid crystals and a sealant arranged between the array substrate and the opposing substrate. The sealant is configured for bonding the array substrate and the opposing substrate to avoid leakage of the liquid crystals. The liquid crystal display panel is a display panel formed by cutting the liquid crystal motherboard. The liquid crystal motherboard is formed by assembling an array motherboard with an opposing motherboard.

In practical application, in order to carry the liquid crystal motherboard, a distance between a liquid crystal region in an edge region of an array motherboard and an edge of the array motherboard is relatively large. In a case that sizes of silicon spheres in the sealant coated on the peripheral regions of different liquid crystal regions are the same, in a process of assembling an opposing motherboard with the array motherboard, affected by a blank region in the edge region of the array motherboard (the blank region refers to a region between the liquid crystal region along the edge region of the array motherboard and an edge 04 of the array motherboard), an assembling force (the assembling force refers to a pressure exerted by silicon spheres on the array motherboard) applied to the edge region of the array motherboard is less than the assembling force applied to the central region of the array motherboard, which leads to uneven forces on the array motherboard. As a result, among the plurality of liquid crystal display panels formed by cutting, a display effect of the liquid crystal panel cut from the edge region of the liquid crystal motherboard is quite different from that of the liquid crystal display panel cut from the central region of the liquid crystal motherboard.

Figure 1:
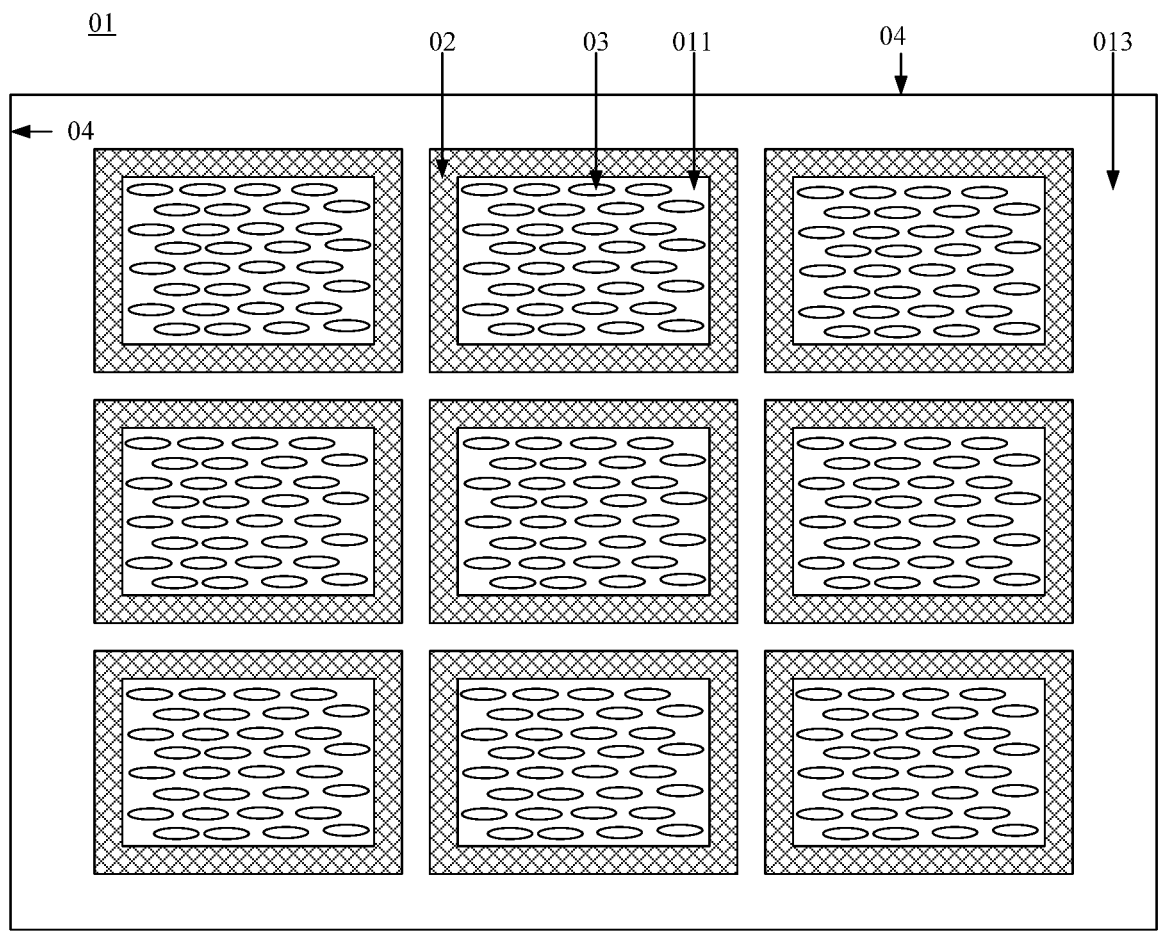
FIG. 1 is a schematic diagram of a structure of a liquid crystal motherboard in related technology.
Figure 2:
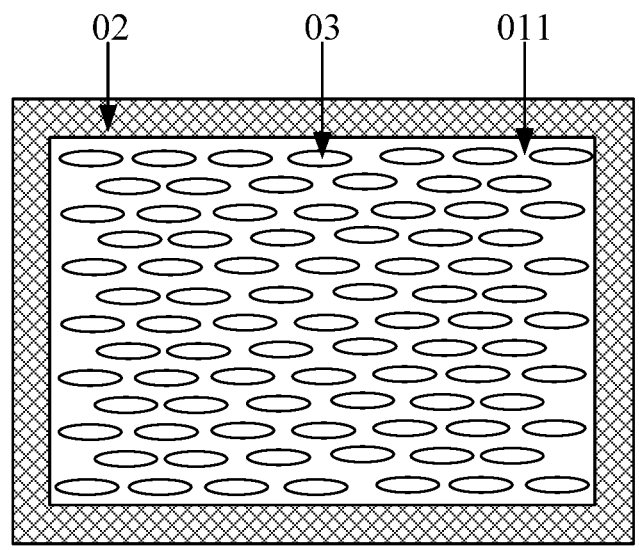
FIG. 2 is a schematic diagram of a structure of a liquid crystal display panel in related technology.
Figure 3:
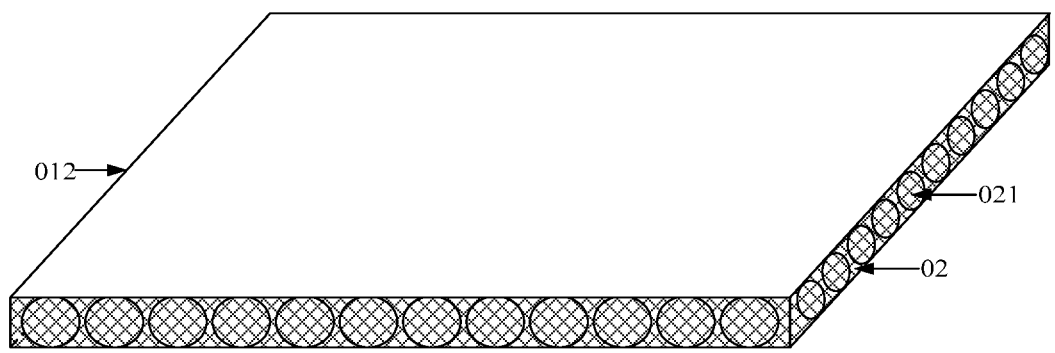
FIG. 3 is a schematic diagram of a three-dimensional structure of a liquid crystal display panel in related technology.

As illustrated in FIG. 1, the array motherboard 01 comprises a plurality of liquid crystal regions 011. In the process of manufacturing liquid crystal display panels, firstly, sealant 02 is coated on the peripheral region of each of the liquid crystal regions 011. Silicon spheres are disposed in the sealant 02, and sizes of the silicon spheres in the sealant 02 coated on the peripheral regions of different liquid crystal regions 011 are the same. Then the liquid crystal 03 is dripped into each of the liquid crystal regions 011, so that the liquid crystal 03 is located in a space enclosed by the sealant 02. After that, an opposing motherboard is assembled with the array motherboard 01, and the sealant 02 is curied, so that the opposing motherboard and the array motherboard 01 are bonded by the sealant 02 to form a liquid crystal motherboard. Finally, the liquid crystal motherboard is cut to form a plurality of liquid crystal display panels. For example, each of the liquid crystal display panels is illustrated in FIG. 2. FIG. 3 illustrates a three-dimensional structure of a liquid crystal display panel illustrated in FIG. 2. With reference to FIG. 3, the silicon spheres 021 are disposed in the sealant 02, and the sizes of the silicon spheres 021 in the sealant 02 of different peripheral regions of the liquid crystal display panel are the same. The silicon spheres 021 can support the array substrate 012 (comprising the liquid crystal region 011 of the array motherboard 01 and the peripheral region of the liquid crystal region 011) and the opposing substrate (not illustrated in FIG. 3) to maintain a cell gap of the liquid crystal display panel.

In practical production process, in order to carry the liquid crystal motherboard, as illustrated in FIG. 1, the distance between the liquid crystal region 011 in an edge region of the array motherboard 01 and the edge 04 of the array motherboard 01 is relatively large, so that the area of the blank region (region 013 illustrated in FIG. 1) along the edge region of the array motherboard 01 is relatively large. In the process of assembling the opposing motherboard with the array motherboard 01, because the sizes of silicon spheres 021 in the sealant 02 coated on the peripheral regions of different liquid crystal regions 011 are the same, the assembling force applied to the edge region of the array motherboard is less than the assembling force applied to the central region of the array motherboard. An assembling effect of the liquid crystal panel cut from the edge region of the liquid crystal motherboard is quite different from that of the liquid crystal display panel cut from the central region of the liquid crystal motherboard. Thicknesses of liquid crystal of the liquid crystal display panels are different from each other, which leads to different display effects. For example, a display color of the liquid crystal display panel cut from the edge region of the liquid crystal motherboard is different from that of the liquid crystal display panel cut from the central region of the liquid crystal display motherboard. In a case that the difference beyond a tolerated range, the display panel is prone to be discarded.

In a display panel and a method for manufacturing the display panel provided by an embodiment of the present disclosure, by a special coordinate design, different sealants are alternately coated, and silicone spheres with different sizes are arranged in different sealants, so that a cell gap at one or two sides of the liquid crystal display panel cut from the edge regions of the liquid crystal motherboard is different from a cell gap at other sides of the liquid crystal display panel, so as to ensure that the display color of the liquid crystal display panel cut from the edge region of the liquid crystal motherboard is the same as that of the liquid crystal display panel cut from the central region of the liquid crystal motherboard, and to reduce the difference between the display effect of the liquid crystal display panel cut from the edge region of the liquid crystal motherboard and that of the liquid crystal display panel cut from the central region of the liquid crystal motherboard. The above-mentioned effects will be described by the following embodiments of the present disclosure.

Figure 4:
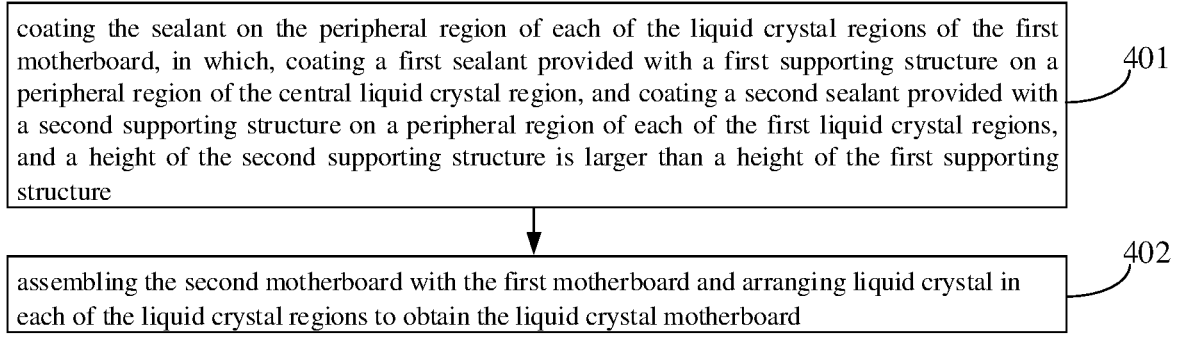
FIG. 4 is a flowchart of a method for manufacturing a display panel provided by an embodiment of the present disclosure.

FIG. 4 is a flowchart of a method for manufacturing a display panel provided by an embodiment of the present disclosure. A liquid crystal motherboard comprises a first motherboard and a second motherboard, and further comprises a plurality of liquid crystal regions arranged in a matrix on the first motherboard. The first motherboard comprises first edges and second edges orthogonal to each other. The plurality of liquid crystal regions comprise first liquid crystal regions adjacent to first edges of the first motherboard and a central liquid crystal region not adjacent to any of the first edges of the first motherboard and any of the second edges of the first motherboard, and the method comprises:

Step 401: coating the sealant on the peripheral region of each of the liquid crystal regions of the first motherboard, for example, coating a first sealant provided with a first supporting structure on a peripheral region of the central liquid crystal region, and coating a second sealant provided with a second supporting structure on a peripheral region of each of the first liquid crystal regions, and a height of the second supporting structure is larger than a height of the first supporting structure.

Step 402: assembling the second motherboard with the first motherboard and arranging liquid crystal in each of the liquid crystal regions to obtain the liquid crystal motherboard.

In summary, in the method for manufacturing the display panel according to the embodiments of the present disclosure, the central liquid crystal region is not adjacent to any of the edges of the first motherboard, the first liquid crystal region is adjacent to the edges of the first motherboard, and the height of the supporting structure in the second sealant coated on the peripheral region of the first liquid crystal region is larger than the height of the supporting structure in the first sealant coated on the peripheral region of the central liquid crystal region. In this way, in the process of assembling the second motherboard with the first motherboard, the assembling force applied to the first motherboard by the supporting structure in the peripheral region of the first liquid crystal region is substantially equal to the assembling force applied to the first motherboard by the supporting structure in the peripheral region of the central liquid crystal region. The force on the first motherboard tends to be uniform, which eliminates the difference between the display effect of the display panel cut from the edge region of the liquid crystal motherboard and the display effect of the display panel cut from the central region of the liquid crystal motherboard, and in turns makes the display effect of different display panels cut from the liquid crystal motherboard identical.

In an embodiment of the present disclosure, the plurality of liquid crystal regions further comprise second liquid crystal region adjacent to the second edges of the first motherboard. Each of the first liquid crystal regions has a first distance from the first liquid crystal region itself to one of the first edges of the first motherboard, and each of the second liquid crystal regions has a second distance from the second liquid crystal region itself to one of the second edges of the first motherboard, and the step 401 further comprises:

in condition that the second distance is less than the first distance, coating the first sealant on a peripheral region of each of the second liquid crystal regions; and in condition that the second distance is greater than or equal to the first distance, coating the second sealant on a peripheral region of each of the second liquid crystal regions.

In an embodiment of the present disclosure, the peripheral region of each of the first liquid crystal regions includes a first peripheral sub-region adjacent to the first edges of the first motherboard, and a second peripheral sub-region not adjacent to any of the first edges of the first motherboard. Coating the second sealant on the peripheral region of each of the first liquid crystal regions comprises: coating the second sealant on the first peripheral sub-region, and coating the first sealant on the second peripheral sub-region.

In an embodiment of the present disclosure, the second sealant coated on the first peripheral sub-region of the first liquid crystal region and the first sealant coated on the second peripheral sub-region of the first liquid crystal region form a closed structure.

In an embodiment of the present disclosure, the second sealants applied on the first peripheral sub-regions of all the first liquid crystal regions are integrally formed.

In an embodiment of the present disclosure, both the first supporting structure and the second supporting structure are in shape of sphere, the height of the first supporting structure is equal to a diameter of the first supporting structure, and the height of the second supporting structure is equal to a diameter of the second supporting structure.

In an embodiment of the present disclosure, the first supporting structure or the second supporting structure comprises at least one selected from the group consisting of a silicon sphere, a plastic sphere, and a glass fiber sphere.

In an embodiment of the present disclosure, the height of the first supporting structure ranges from 3.6 microns to 4.4 microns; and the height of the second supporting structure ranges from 3.8 microns to 4.6 microns.

In an embodiment of the present disclosure, after the Step 402, the method further comprises:

cutting the liquid crystal motherboard along cutting lines of the liquid crystal motherboard to obtain a plurality of display panels, and orthographic projections of the cutting lines on the first motherboard are located between every two adjacent liquid crystal regions.

In an embodiment of the present disclosure, the Step 402 comprises:

assembling the second motherboard with the first motherboard, and the liquid crystal is arranged in each of the liquid crystal regions; and curing the sealant to obtain the liquid crystal motherboard.

In an embodiment of the present disclosure, the first motherboard is an array motherboard, and the second motherboard is an opposing motherboard; or, the first motherboard is the opposing motherboard, and the second motherboard is the array motherboard.

All the above-mentioned technical solutions may be combined in any manners to form practicable embodiments of the present disclosure, which is omitted herein.

In summary, in the method of manufacturing the display panel according to the embodiments of the present disclosure, the central liquid crystal region is located at a central region of the first motherboard, the first liquid crystal region is located at a first edge region of the first motherboard, and the height of the second supporting structure in the second sealant coated on the peripheral region of the first liquid crystal region is larger than the height of the first supporting structure in the first sealant coated on the peripheral region of the central liquid crystal region. In this way, in the process of assembling the second motherboard with the first motherboard, the assembling force applied to the first motherboard by the second supporting structure in the second sealant coated on the peripheral region of the first liquid crystal region is substantially equal to the assembling force applied to the first motherboard by the first supporting structure in the first sealant coated on the peripheral region of the central liquid crystal region. The force on the first motherboard tends to be uniform, which eliminates the difference between the display effect of the display panel cut from the edge region of the liquid crystal motherboard and the display effect of the display panel cut from the central region of the liquid crystal motherboard, and makes the display effect of different display panels cut from the liquid crystal motherboard consistent.

Figure 5:
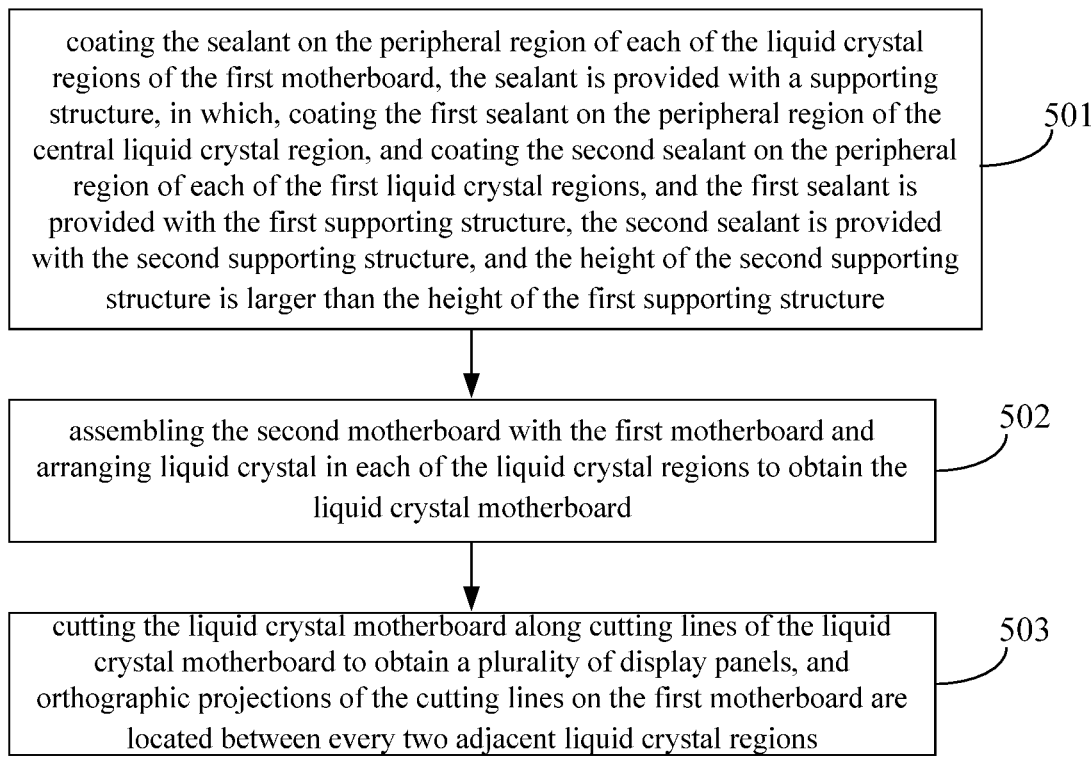
FIG. 5 is another flowchart of a method for manufacturing the display panel provided by an embodiment of the present disclosure.

Referring to FIG. 5, FIG. 5 illustrates a flowchart of a method for manufacturing the display panel provided by another embodiment of the present disclosure. The liquid crystal motherboard comprises the first motherboard, the second motherboard, and the plurality of liquid crystal regions arranged in a matrix on the first motherboard, the first motherboard comprises first edges and second edges orthogonal to each other. The plurality of liquid crystal regions comprise first liquid crystal regions adjacent to first edges of the first motherboard and a central liquid crystal region not adjacent to any of the first edges of the first motherboard and any of the second edges of the first motherboard, and the method comprises:

Step 501, coating the sealant on the peripheral region of each of the liquid crystal regions of the first motherboard, the sealant is provided with a supporting structure. For example, coating the first sealant on the peripheral region of the central liquid crystal region, and coating the second sealant on the peripheral region of each of the first liquid crystal regions, and the first sealant is provided with the first supporting structure, the second sealant is provided with the second supporting structure, and the height of the second supporting structure is larger than the height of the first supporting structure.

In the present embodiment, the plurality of liquid crystal regions further comprise second liquid crystal regions located in second edge regions of the first motherboard.

Figure 6:
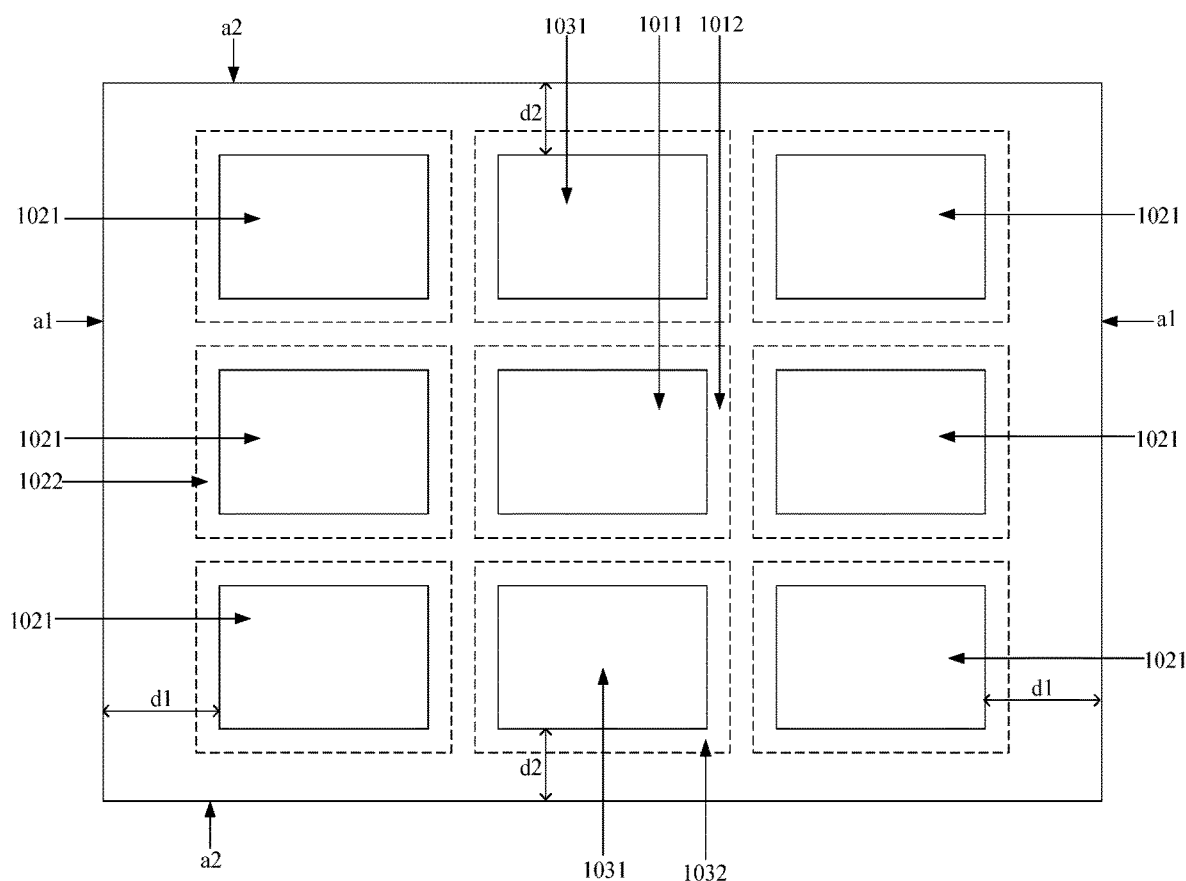
FIG. 6 is a schematic diagram of a structure of a first motherboard provided by an embodiment of the present disclosure.

FIG. 6 is a schematic diagram of a structure of a first motherboard 10 provided by an embodiment of the present disclosure. The first motherboard 10 comprises a plurality of liquid crystal regions and a peripheral region located outside each of the liquid crystal regions. As illustrated in FIG. 6, the present embodiment is illustrated by taking the first motherboard 10 as a rectangular plate for example. Referring to FIG. 6, the first motherboard 10 comprises two first edges a1 disposed opposite to each other and two second edges a2 disposed opposite to each other. The plurality of liquid crystal regions comprise a central liquid crystal region 1011, first liquid crystal regions 1021, and second liquid crystal regions 1031. The central liquid crystal region 1011 is located in the central region of the first motherboard 10, and is not adjacent to any of the first edge a1 or the second edge a2 of the first motherboard 10. The first liquid crystal region 1021 is adjacent to the first edge a1 of the first motherboard 10, and the second liquid crystal region 1031 is adjacent to the second edge a2 of the first motherboard 10. The first motherboard 10 further comprises a peripheral region 1012 of the central liquid crystal region 1011, a peripheral region 1022 of the first liquid crystal region 1021 and a peripheral region 1032 of the second liquid crystal region 1031. Each of the first liquid crystal regions 1021 has a first distance d1 from the first liquid crystal region to one of the first edges a1 of the first motherboard 10, and each of the second liquid crystal regions 1031 has a second distance d2 the second liquid crystal region to one of the second edges a2 of the first motherboard 10.

In an embodiment of present disclosure, the sealant is coated on the peripheral region of each of the liquid crystal regions of the first motherboard. The supporting structure is arranged in the sealant, and the height of the supporting structure in the sealant coated on the peripheral region 1022 of the first liquid crystal region 1021 is higher than the height of the supporting structure in the sealant coated on the peripheral region 1012 of the central liquid crystal region 1011. The height of the supporting structure in the sealant coated on the peripheral region 1032 of the second liquid crystal region 1031 is equal to the height of the supporting structure in the sealant coated on the peripheral region 1022 of the first liquid crystal region 1021, or, the height of the supporting structure in the sealant coated on the peripheral region 1032 of the second liquid crystal region 1031 is equal to the height of the supporting structure in the sealant coated on the peripheral region 1012 of the central liquid crystal region 1011. For example, the supporting structure is in a shape of sphere, and the height of the supporting structure is equal to the diameter of the sphere. For example, the supporting structure comprises at least one selected from the group consisting of a silicon sphere, a plastic sphere, and a glass fiber sphere. It can be contemplated that, in practical application, the supporting structure may be in other shapes, such as the supporting structure is a cylinder, a prismoid, etc., which is not limited in the embodiment of the present disclosure. In the embodiment of the present disclosure, a height of the supporting structure in the sealant coated on the peripheral region 1012 of the central liquid crystal region 1011 ranges from 3.6 microns to 4.4 microns. The height of the supporting structure in the sealant coated on the peripheral region of 1022 of the first liquid crystal region 1021 ranges from 3.8 microns to 4.6 microns.

Figure 7:
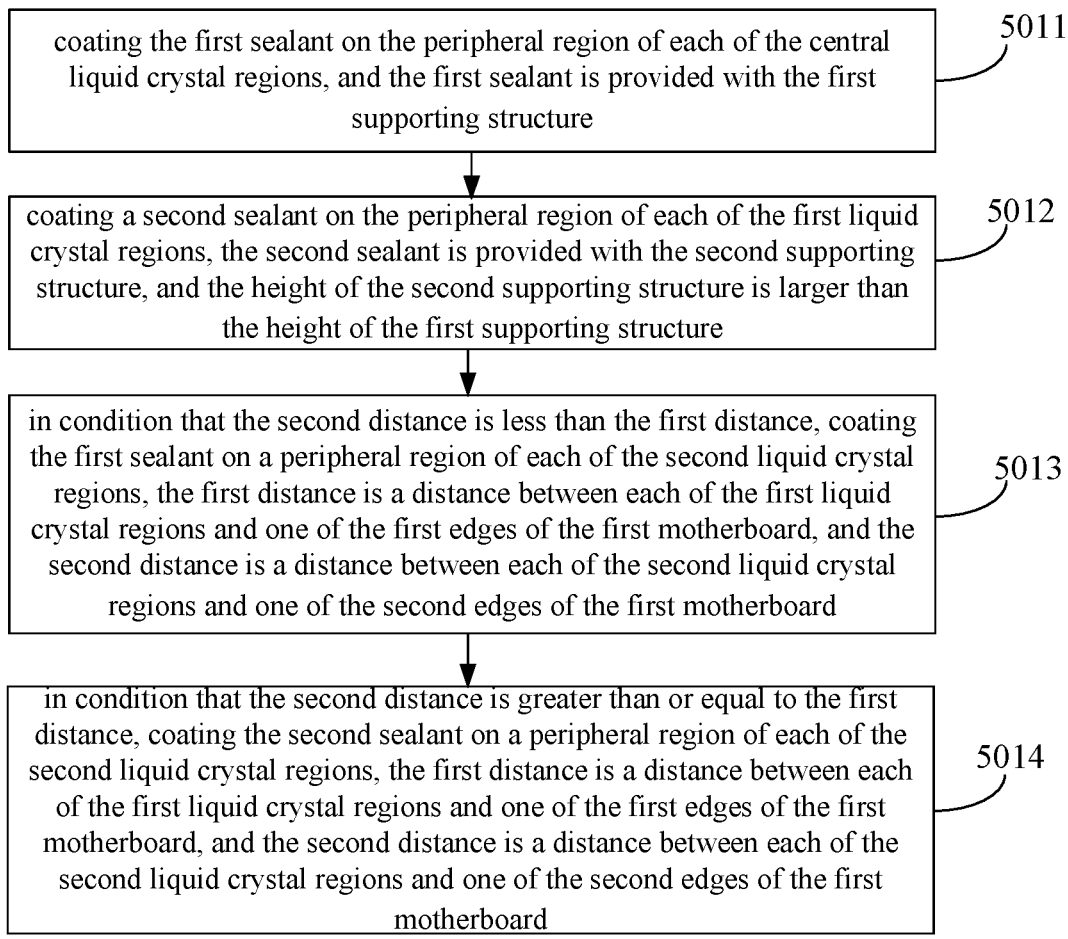
FIG. 7 is a flowchart of a method for coating a sealant on a peripheral region of each liquid crystal region of the first motherboard provided by an embodiment of the present disclosure.

In an embodiment of the present disclosure, FIG. 7 illustrates a flowchart of a method for coating a sealant on a peripheral region of each of the liquid crystal regions of the first motherboard provided by an embodiment of the present disclosure, as illustrated in FIG. 7, the method comprises:

Step 5011: coating the first sealant on the peripheral region of each central liquid crystal region, the first sealant is provided with the first supporting structure.

Figure 8:
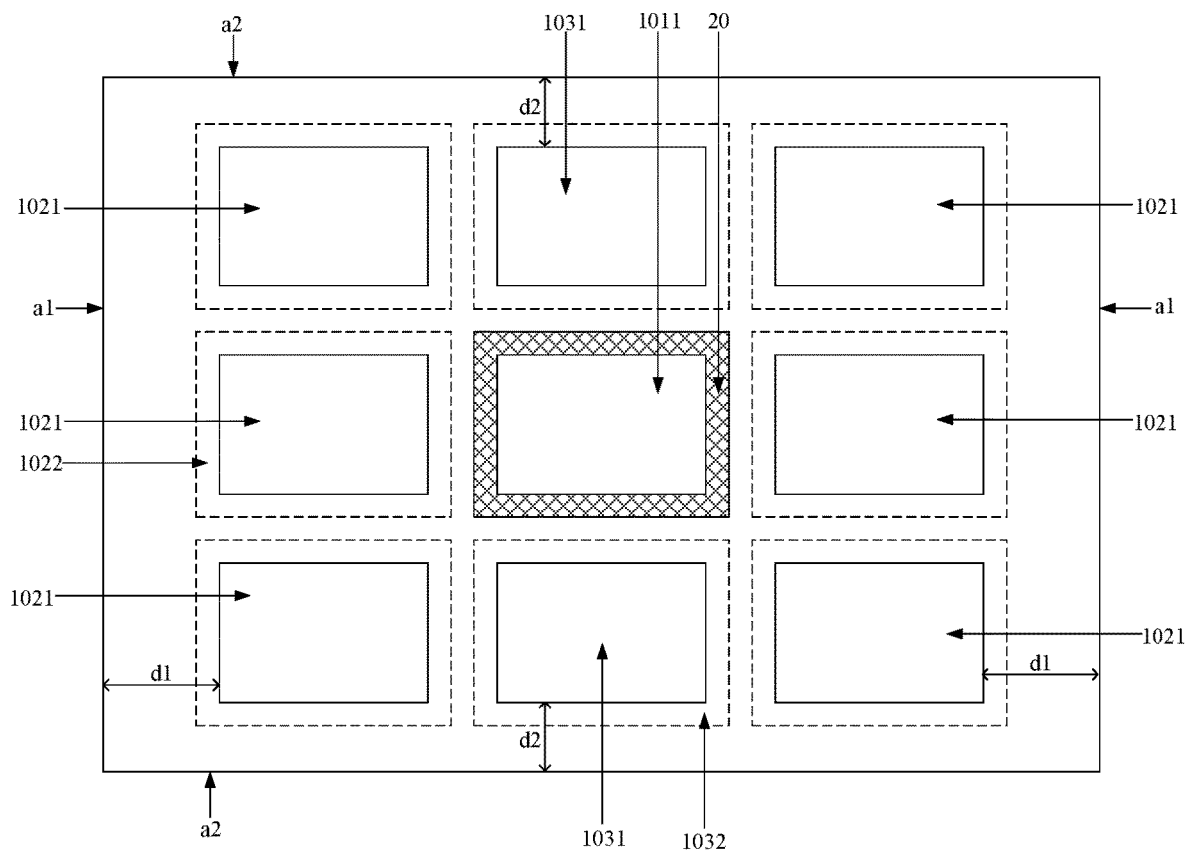
FIG. 8 is a schematic diagram of a motherboard structure provided by an embodiment of the present disclosure after a first sealant is coated on a peripheral region of a central liquid crystal region.

Referring to FIG. 8, FIG. 8 illustrates a schematic diagram of a motherland structure after the first sealant 20 is coated on a peripheral region 1012 of each central liquid crystal region provided by the embodiment of the present disclosure. With reference to FIG. 6 and FIG. 8, the first sealant 20 is located in the peripheral region 1012 of the central liquid crystal region 1011, and the first sealant 20 on the peripheral region 1012 of each central liquid crystal region 1011 is integrally formed. The first supporting structure (not illustrated in FIG. 8) is arranged in the first sealant 20. The first supporting structure may be in a shape of sphere and the height of the first supporting structure is equal to the diameter of the sphere. For example, the first supporting structure may be at least one of the silicon sphere, the plastic sphere and the glass fibre sphere. It can be contemplated that, in practice, the first supporting structure may be in other shapes. For example, the first supporting structure may be a cylinder, a prismoid, etc., which is not limited in the embodiment of the present disclosure. In the present disclosure embodiment, the height of the first supporting structure may comprise 3.6 microns to 4.4 microns. In a case that the first supporting structure is in a shape of sphere, that is to say, the diameter of the first supporting structure ranges from 3.6 microns to 4.4 microns. In practice, the height of the first supporting structure may be set according to actual requirements, which is not limited in the embodiment of the present disclosure.

In an embodiment of the present disclosure, mixing the first supporting structure with the conventional sealant to obtain the first sealant 20, and then coating the first sealant 20 on the peripheral region 1012 of each central liquid crystal region 1011 by a coating equipment. In the embodiment of the present disclosure, the coating equipment is a coating needle tube. It can be contemplated that, in the practical application, the coating equipment may be other equipments for coating the sealant, which is not limited in the embodiment of the present disclosure.

Step 5012, coating a second sealant on the peripheral region of each of the first liquid crystal regions, the second sealant is provided with the second supporting structure, and the height of the second supporting structure is larger than the height of the first supporting structure.

Figure 9:
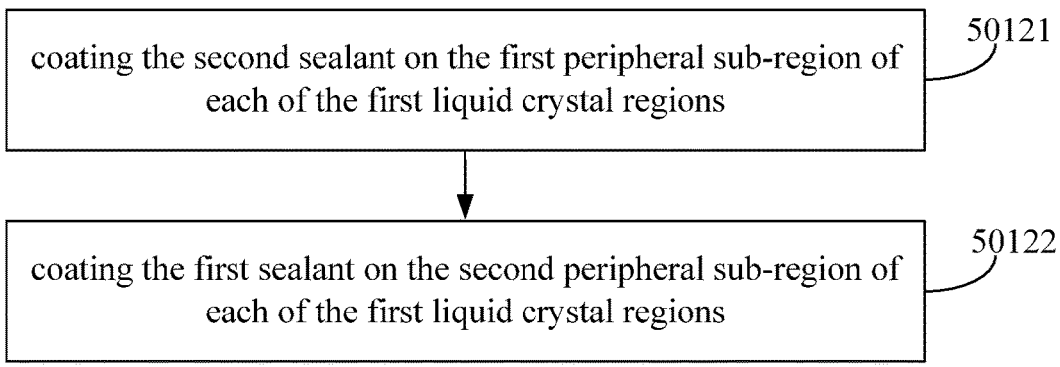
FIG. 9 is a flowchart of a method for coating a second sealant on a peripheral region of a first liquid crystal region provided by an embodiment of the present disclosure.

In the embodiment of the present disclosure, the peripheral region of the first liquid crystal region comprises a first peripheral sub-region adjacent to the first edge of the first motherboard and a second peripheral sub-region not adjacent to the first edge. In condition that the second sealant is coated on the peripheral region of the first liquid crystal region, the second sealant is coated on both the first peripheral sub-region and the second peripheral sub-region, or the second sealant is coated on only the first peripheral region while the first sealant is coated on the second peripheral sub-region. The embodiment of the present disclosure is illustrated by coating the second sealant on the first peripheral region and coating the first sealant on the second peripheral sub-region. For example, FIG. 9 illustrates a flowchart of a method for coating the second sealant on the peripheral region of the first liquid crystal region provided by an embodiment of the present disclosure, the method comprises:

Step 50121: coating the second sealant on the first peripheral sub-region of each of the first liquid crystal regions.

Figure 10:
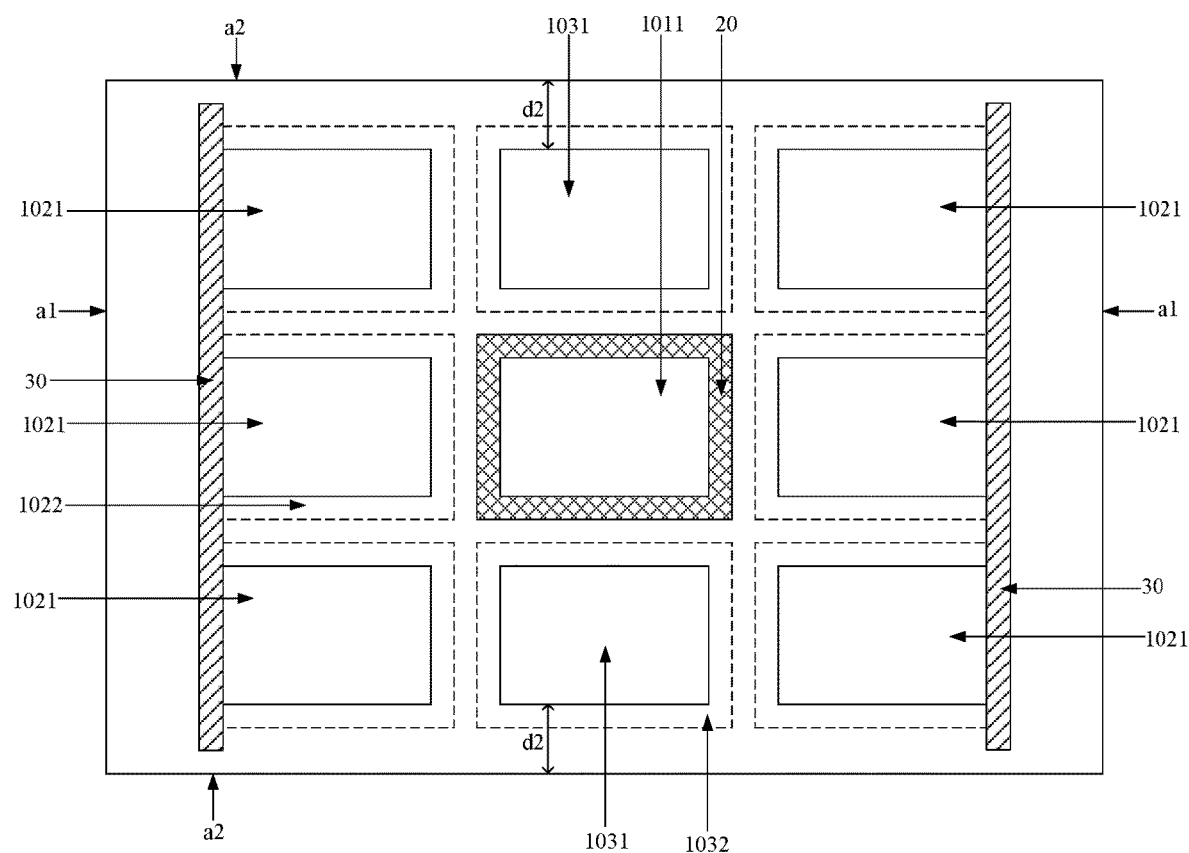
FIG. 10 is a schematic diagram of a motherboard structure provided by an embodiment of the present disclosure after the second sealant is coated on a first peripheral sub-region of the first liquid crystal region.

FIG. 10 illustrates a schematic diagram of the motherboard structure provided by an embodiment of the present disclosure after the second sealant 30 is coated on the first peripheral sub-region of each of the first liquid crystal regions 1021 adjacent to the first edges a1. With reference to FIG. 6 and FIG. 10, the second sealant 30 is located in the first peripheral sub-region of the first liquid crystal region 1021, that is, the region of the peripheral region of the first liquid crystal region adjacent to the first edges a1. The second sealant 30 is provided with the second supporting structure, and the second sealants 30 in the first peripheral sub-region 1021s of all the first liquid crystal regions 1021 adjacent to the first edges a1 of the first motherboard 10 are integrally formed. That is to say, the second sealants 30 in the first peripheral sub-regions of all the first liquid crystal regions 1021 adjacent to the first edges a1 of the first motherboard 10 are formed by a single coating. However, in practice application, the second sealant 30 may also be coated separately on the respective first peripheral sub-regions, adjacent to the first edges a1, of the peripheral regions 1022 of the first liquid crystal regions 1021, which is not limited in the embodiment of the present disclosure.

In the embodiment of the present disclosure, the height of the second supporting structure is larger than the height of the first supporting structure. The second supporting structure is in shape of sphere, the height of the second supporting structure is a diameter of a sphere. For example, the second supporting structure comprises at least one selected from the group consisting of a silicon sphere, a plastic sphere, and a glass fiber sphere. It can be contemplated that, in practice, the second supporting structure may be in other shapes. For example, the second supporting structure may be a cylinder, a prismoid, etc., which is not limited in the embodiment of the present disclosure. In the embodiment of the present disclosure, the height of the second supporting structure ranges from 3.6 microns to 4.4 microns. In a case that the second supporting structure is in a shape of sphere, that is to say, the diameter of the second supporting structure ranges from 3.6 microns to 4.4 microns. In practice, the height of the second supporting structure may be set according to actual requirements, which is not limited in the embodiment of the present disclosure.

In an embodiment of the present disclosure, mixing the second supporting structure with the conventional sealant to obtain the second sealant 30, and then coating the second sealant 30 on a region of the peripheral region 1022, adjacent to the first edges a1, of each first liquid crystal region 1021 by a coating equipment. And the second sealants 30 in the first peripheral sub-regions of all the first liquid crystal regions 1021 adjacent to the same first edge a1 of the first motherboard 10 are formed by a single coating. In the present disclosure embodiment, the coating equipment is a coating needle tube, and it can be contemplated that, in the practical application, the coating equipment may be other equipments for coating the sealant, which is not limited in the embodiment of the present disclosure.

Step 50122: coating the first sealant on the second peripheral sub-region of each of the first liquid crystal regions.

Figure 11:
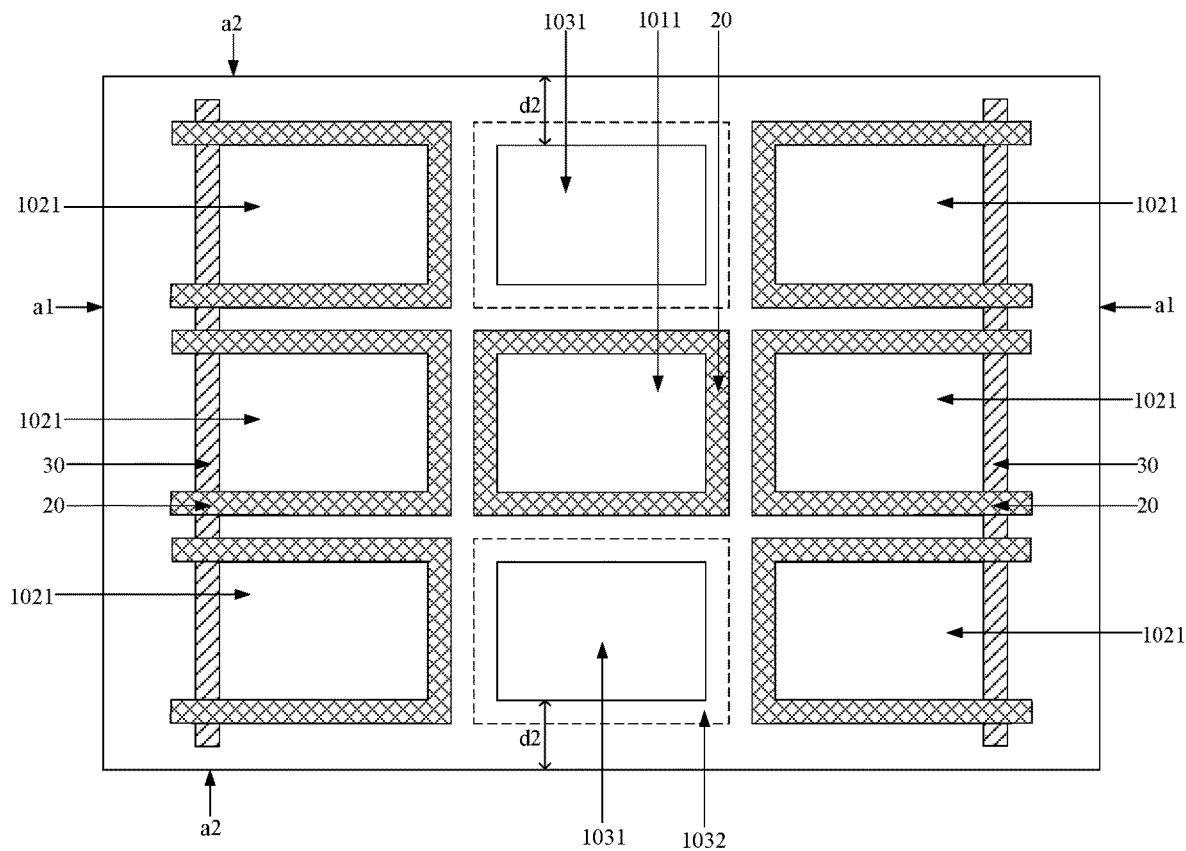
FIG. 11 is a schematic diagram of a motherboard structure provided by an embodiment of the present disclosure after the first sealant is coated on a second peripheral sub-region of the first liquid crystal region.

FIG. 11 illustrates a schematic diagram of a motherland structure provided by an embodiment of the present disclosure after the first sealant 20 is coated on the second peripheral sub-region of each of the first liquid crystal regions 1021. With reference to FIG. 6 and FIG. 11, the first sealant 20 in the second peripheral sub-region of each of first liquid crystal regions 1021 can be integrally formed. The first sealant 20 in the second peripheral sub-region of each of the first liquid crystal regions 1021 and the second sealant 30 in the first peripheral sub-region 1022 of each of the first liquid crystal regions 1021 form a closed structure. In the practical application, the first sealant 20 in the first peripheral sub-region of each of the first liquid crystal regions 1021 intersects with the second sealant 30 in the second peripheral sub-region of the first liquid crystal regions 1021 to ensure that the first sealant 20 is in close contact and integrated with the second sealant 30 to form the closed structure in the peripheral region 1022 of each of the first liquid crystal regions 1021.

In an embodiment of the present disclosure, mixing the first supporting structure with the conventional sealant to obtain the first sealant 20, and then coating the first sealant 20 on the second peripheral sub-region of each of the first liquid crystal regions 1021 by the coating equipment. The first sealant 20 in the second peripheral sub-region of each of the peripheral sub-regions 1022 is formed by a single coating. The first sealant 20 in the second peripheral sub-region and the second sealant 30 in the first peripheral sub-region form a closed structure. In the present disclosure embodiment, the coating equipment is a coating needle tube, and of course, in the practical application, the coating equipment may be other equipments for coating the sealant, which is not limited in the embodiment of the present disclosure.

It should be noted that, in practical application, the sequence of step 50121 and step 50122 described above is interchangeable, which is not limited in the embodiment of the present disclosure. It should further be noted that, in the embodiment of the present disclosure, the first sealant is coated on the peripheral region of the central liquid crystal region, the second sealant is coated on the peripheral region of the first liquid crystal region, and the sealant can also be coated on the peripheral region of the second liquid crystal region. According to the magnitude relationship between the second distance and the first distance, the first sealant is coated on the peripheral region of the second liquid crystal region, or the second sealant is coated on the peripheral region of the second liquid crystal region. With reference to step 5013 and step 5014 described below.

Step 5013, in condition that the second distance is less than the first distance, coating the first sealant on a peripheral region of each of the second liquid crystal regions.

In an embodiment of the present disclosure, as described in step 501, the first distance is d1 and the second distance is d2. The magnitude relationship between the second distance d2 and the first distance d1 can be determined by comparing the second distance d2 with the first distance d1. In condition that the second distance d2 is less than the first distance d1, coating the first sealant on a peripheral region of each of the second liquid crystal regions. The step is illustrated by taking the second distance d2 less than the first distance d1 as an example.

Figure 12:
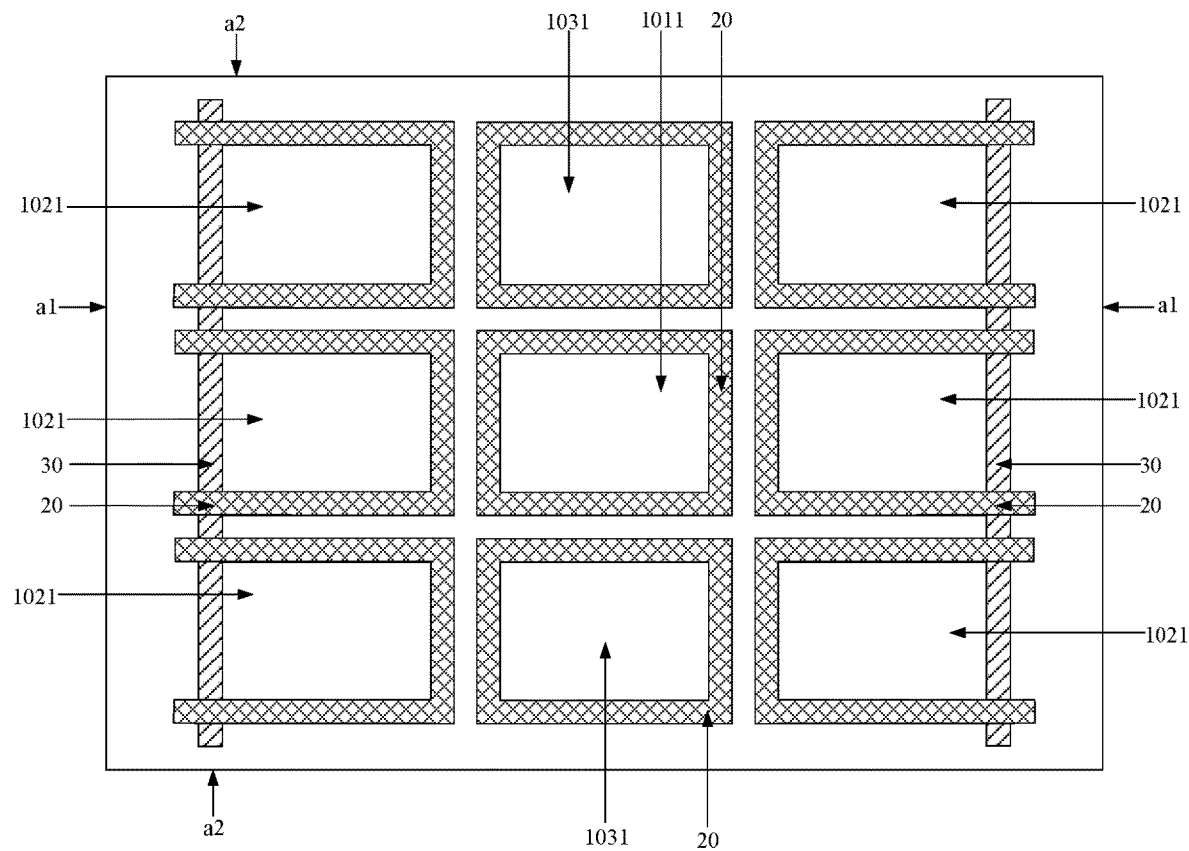
FIG. 12 is a schematic diagram of a motherboard structure provided by an embodiment of the present disclosure after the first sealant is coated on a peripheral region of a second liquid crystal region.

FIG. 12 illustrates a schematic diagram of a motherboard structure provided by an embodiment of the present disclosure after the first sealant 20 is coated on the peripheral region 1032 of the second liquid crystal region 1031. With reference to FIG. 6 and FIG. 12, the first sealant 20 is located in the peripheral region 1032 of the second liquid crystal region 1031, and the first sealant 20 in the peripheral region 1032 of each of the second liquid crystal regions 1031 is integrally formed, and the first sealant 20 is provided with the first supporting structure.

Step 5014, in condition that the second distance is greater than or equal to the first distance, coating the second sealant on the peripheral region of the second liquid crystal region.

In an embodiment of the present disclosure, as described in step 501, the first distance is d1 and the second distance is d2. The magnitude relationship between the second distance d2 and the first distance d1 can be determined by comparing the second distance d2 with the first distance d1. In condition that the second distance d2 is greater than or equal to the first distance d1, coating the second sealant on the peripheral region of the second liquid crystal region. The step is illustrated by taking the second distance d2 greater than or equal to the first distance d1 as an example.

Figure 13:
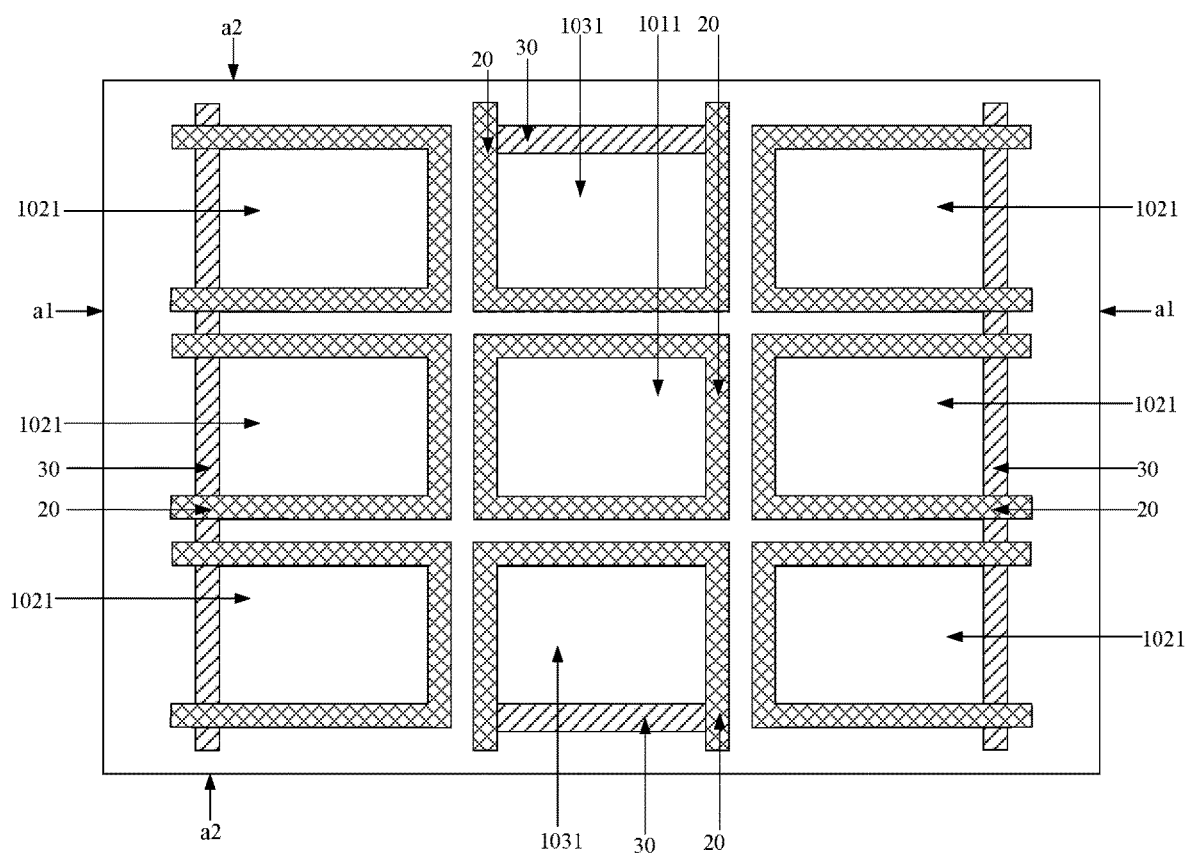
FIG. 13 is a schematic diagram of a motherboard structure provided by an embodiment of the present disclosure after the second sealant is coated on the peripheral region of the second liquid crystal region.

FIG. 13 illustrates a schematic diagram of a motherboard structure provided by an embodiment of the present disclosure after the second sealant 30 is coated on the peripheral region 1032 of the second liquid crystal regions 1031. With reference to FIG. 6 and FIG. 13, the second sealant 30 is coated on a third peripheral sub-region of the peripheral region 1032 of the second liquid crystal region 1031, and the first sealant 20 is coated in a fourth peripheral sub-region of the peripheral region 1032 of the second liquid crystal region 1031. The third peripheral sub-region refers to a region, adjacent to the second edge a2, in the peripheral region 1032 of the second liquid crystal region 1031, and the fourth peripheral sub-region refers to the remaining region in the peripheral region 1032 of the second liquid crystal region 1031 other than the region adjacent to the second edge a2. The first sealant 20 coated on the fourth peripheral sub-region is integrally formed, and the first sealant 20 is provided with the first supporting structure.

Figures 14, 15:
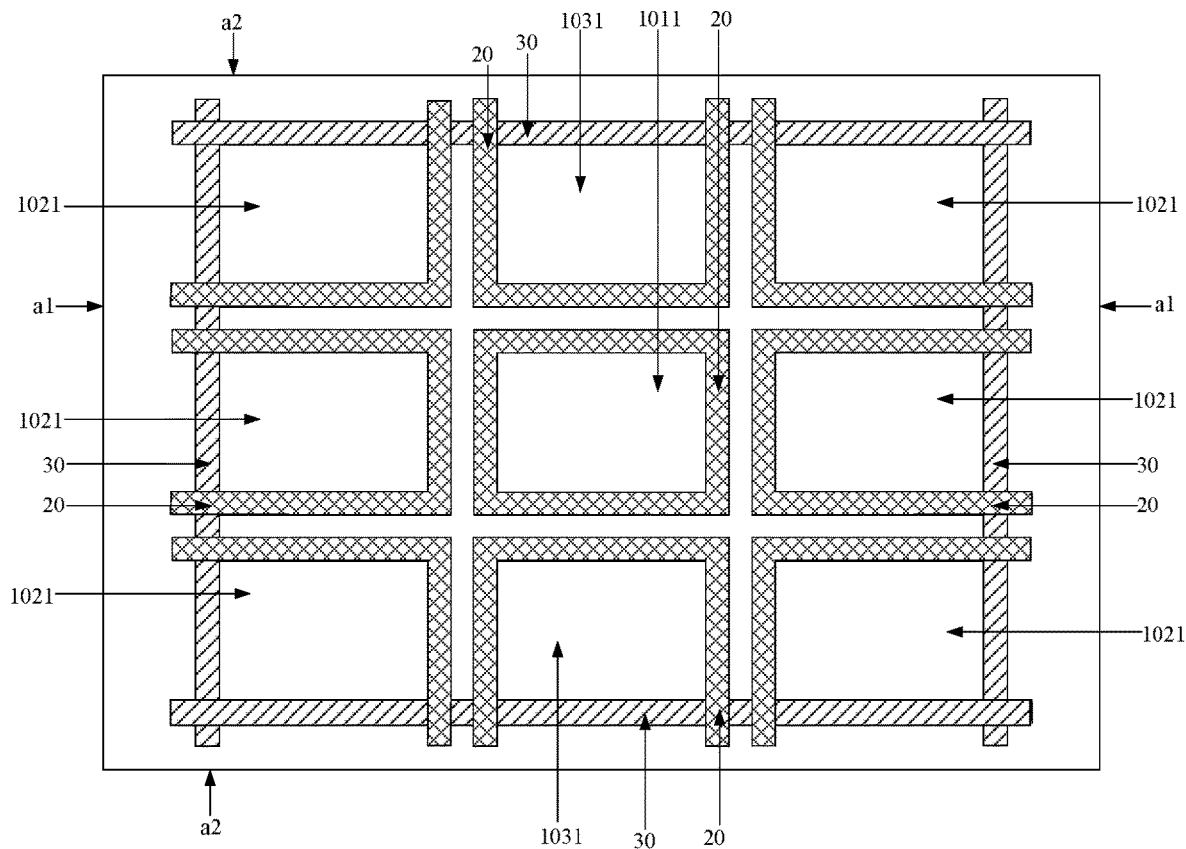
FIG. 14 is a schematic diagram of a motherboard structure provided by another embodiment of the present disclosure after the second sealant is coated on a third peripheral sub-region of the second liquid crystal region.
FIG. 15 is a flowchart of a method for obtaining a liquid crystal motherboard by assembling a second motherboard with a first motherboard provided by an embodiment of the present disclosure.

It should be noted that, in the practical application, in condition that the second distance d2 is greater than or equal to the first distance d1, as illustrated in FIG. 14, the second sealant 30 is coated on the peripheral region 1022 of the first liquid crystal region 1021, for example, the second sealant 30 is coated in both a region adjacent to the first edge a1 (that is the first peripheral sub-region) and a region adjacent to the second edge a2 (that is the third peripheral sub-region) of the peripheral region 1022 of the first liquid crystal region 1021. In the peripheral region 1022 of the first liquid crystal region 1021, the first sealant 20 is coated on the regions except the region adjacent to the first edge a1 and the region adjacent to the second edge a2, and the second sealants 30 in all the regions adjacent to the second edge a2 are integrally formed.

Step 502, assembling the second motherboard with the first motherboard and arranging liquid crystal in each of the liquid crystal regions to obtain the liquid crystal motherboard.

In the embodiment of the present disclosure, the second motherboard is an array motherboard, or an opposing motherboard. In a case that the first motherboard in step 501 is the array motherboard, the second motherboard is the opposing motherboard; in a case that the first motherboard in step 501 is the opposing motherboard, the second motherboard is the array motherboard. For example, FIG. 15 illustrates a flowchart of a method for obtaining a liquid crystal motherboard by assembling the second motherboard with the first motherboard provided by an embodiment of the present disclosure. With reference to FIG. 15, the method comprises:

Step 5021, assembling the second motherboard with the first motherboard and arranging liquid crystal in each of the liquid crystal regions.

Figure 16:
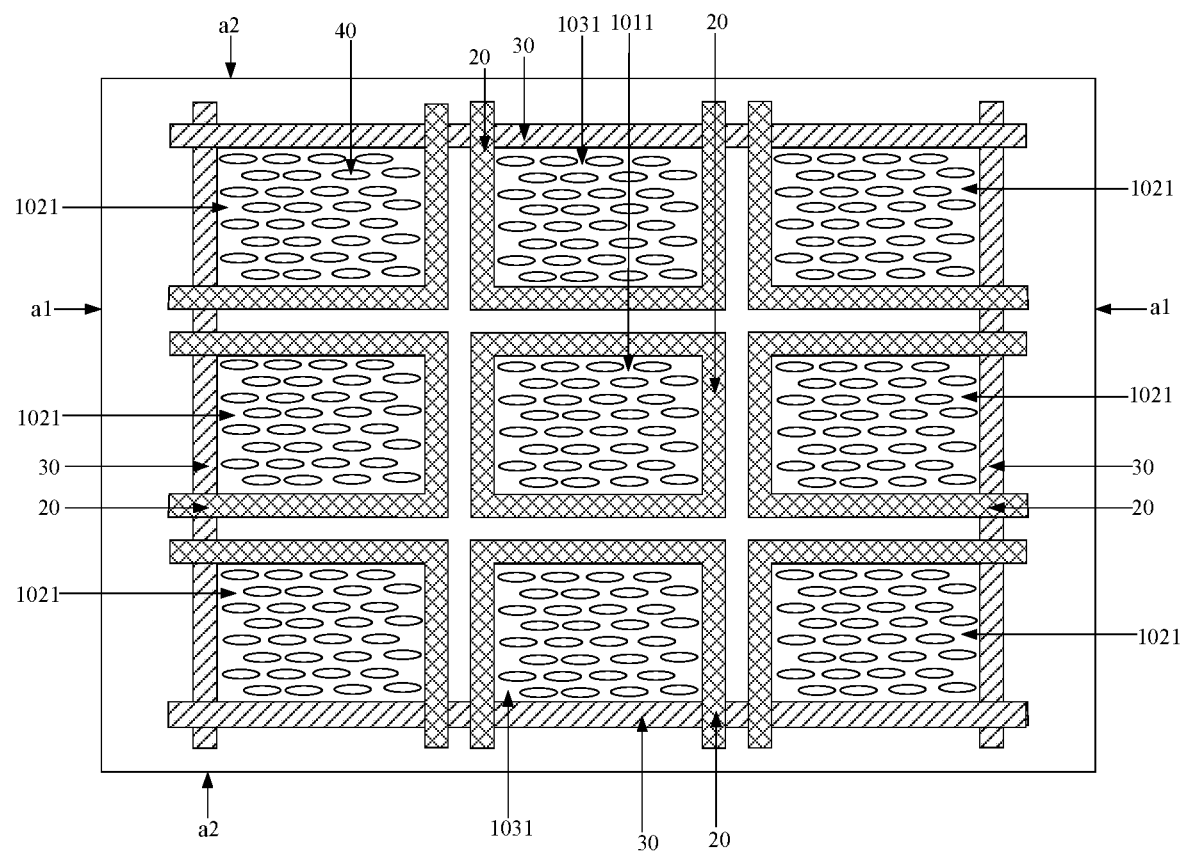
FIG. 16 is a schematic diagram of a motherboard structure provided by an embodiment of the present disclosure after dripping liquid crystals in a liquid crystal region of the first motherboard.

For example, the liquid crystal is dripped into each of the liquid crystal regions of the first motherboard, and then the second motherboard is arranged on a side of the first motherboard dripped with the liquid crystal, and the assembling force is applied to the first motherboard and the second motherboard, so that the second motherboard is assembled with the first motherboard, and each of the liquid crystal regions is provided with the liquid crystal. For example, with reference to FIG. 16, which illustrates a schematic diagram of a motherland structure provided by an embodiment of the present disclosure after the liquid crystal 40 is dripped into each of the liquid crystal regions of the first motherboard 10. With reference to FIG. 16, the liquid crystal 40 is arranged in the central liquid crystal region 1011, the first liquid crystal regions 1021 and the second liquid crystal regions 1031. In the embodiment of the present disclosure, after the liquid crystal 40 is dripped into each of the liquid crystal regions of the first motherboard 10, the second motherboard (not illustrated in FIG. 16) is arranged on a side of the first motherboard 10 dripped with the liquid crystal 40, and an assembling force is applied to both the first motherboard 10 and the second motherboard, so that the second motherboard is assembled with the first motherboard 10, and the liquid crystal 40 is arranged in each of the liquid crystal regions.

Step 5022, curing the sealant to obtain the liquid crystal motherboard.

The sealant (comprising a first sealant 20 and a second sealant 30) usually contains a thermal curable component and a photosensitive component. Optionally, the assembled second motherboard and the first motherboard are arranged in an ultraviolet (abbreviated as "UV") curing chamber, and the photosensitive component in the sealant is curied under the ultraviolet irradiation, then the assembled second motherboard and first motherboard are arranged in a high temperature furnace to heat the sealant (comprising the first sealant 20 and the second sealant 30), so that the thermal curable component in the sealant is curied. It can be contemplated that, in the practical application, the thermal curable component in the sealant is curied firstly, and then the photosensitive component in the sealant is curied, which is not limited in the embodiment of the present disclosure.

Step 503, cutting the liquid crystal motherboard along cutting lines of the liquid crystal motherboard to obtain a plurality of display panels, and orthographic projections of the cutting lines on the first motherboard are located between every two adjacent liquid crystal regions.

After assembling the second motherboard with the first motherboard to obtain the liquid crystal motherboard, the liquid crystal motherboard can be cut along cutting lines of the liquid crystal motherboard to obtain a plurality of display panels, and orthographic projections of the cutting lines on the first motherboard are located between every two adjacent liquid crystal regions, and the orthographic projections of the cutting lines on the first motherboard are located outside the peripheral region of the liquid crystal region. Among them, the implementation process for cutting the liquid crystal motherboard along the cutting lines of the liquid crystal motherboard may be referred to the related technology, which is omitted in the embodiment of the present disclosure.

Figure 17:
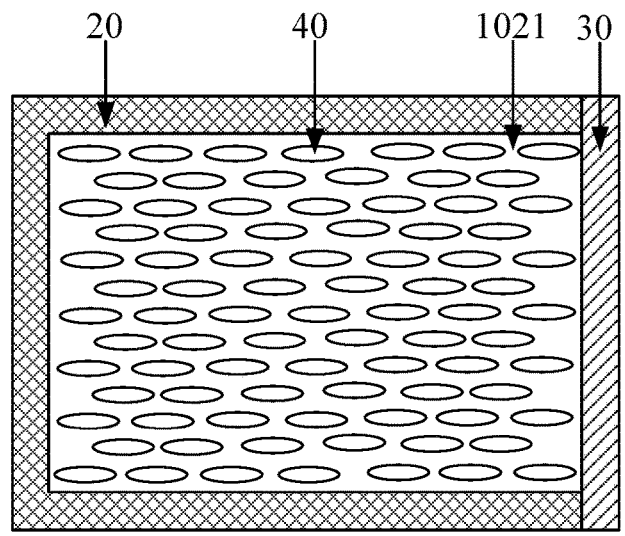
FIG. 17 is a schematic diagram of a motherboard structure of a display panel provided by an embodiment of the present disclosure.
Figure 18:
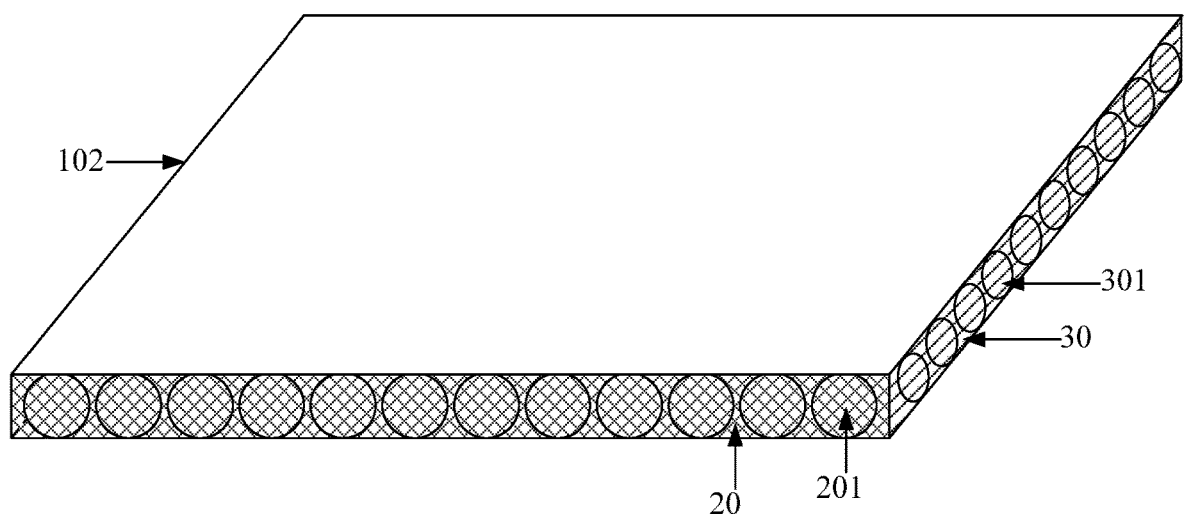
FIG. 18 is a schematic diagram of a three-dimensional structure of the display panel provided by an embodiment of the present disclosure.

Optionally, with reference to FIG. 17, which illustrates a schematic diagram of a display panel cut from the first edge region of the liquid crystal motherboard (an orthographic projection of the first edge region of the liquid crystal motherboard on the first motherboard coincides with the first edge region of the first motherboard) according to an embodiment of the present disclosure. FIG. 18 is a schematic diagram of the three-dimensional structure of the display panel illustrated in FIG. 17. With reference to FIG. 17 and FIG. 18, the display panel comprises a first substrate 102 (comprising the first liquid crystal region 1021 of the first motherboard 10 and the peripheral region 1022 of the first liquid crystal region 1021) and the second substrate (a portion of the second motherboard corresponding to the first substrate, which is not illustrated in FIG. 17 and FIG. 18) assembled to each other. The second sealant 30 is coated on one of the peripheral regions of the liquid crystal region of the display panel, and the other three peripheral regions are coated with the first sealant 20. The height of the second supporting structure 301 in the second sealant 30 is larger than that of the first supporting structure 201 in the first sealant 20.

It should be noted that, the present disclosure is illustrated by taking the display panel cut from the first edge region of the liquid crystal motherboard as an example. The structure of the display panel cut from the central region of the liquid crystal motherboard (an orthographic projection of the central region of the liquid crystal motherboard on the first motherboard coincides with the orthographic projection of central of the first motherboard) may be referred to FIG. 2 and FIG. 3, which is omitted in the embodiment of the present disclosure.

It should further be noted that, the sequence of steps in the manufacturing method of the display panel according to the embodiment of the present disclosure may be adjusted appropriately, and the steps may be increased or decreased accordingly according to actual situations. Within the scope of the technology disclosed in the present disclosure, any modified method that can easily be constructed by those skilled in the art who are familiar with the technical field should be considered as within the scope of protection of the present disclosure, which is omitted herein.

In summary, in the manufacturing methods of the display panel according to the embodiments of the present disclosure, the central liquid crystal region is not adjacent to the edges of the first motherboard, the first liquid crystal region is adjacent to the edges of the first motherboard, and the height of the supporting structure in the second sealant coated on the peripheral region of the first liquid crystal region is higher than the height of the supporting structure in the first sealant coated on the peripheral region of the central liquid crystal region. In this way, in the process of assembling the second motherboard with the first motherboard, the assembling force applied to the first motherboard by the supporting structure in the peripheral region of the first liquid crystal region is substantially equal to the assembling force applied to the first motherboard by the supporting structure in the peripheral region of the central liquid crystal region. The force on the first motherboard tends to be uniform, which eliminates the difference between the display effect of the display panel cut from the edge region of the liquid crystal motherboard and the display effect of the display panel cut from the central region of the liquid crystal motherboard, and in turns makes the display effects of different display panels cut from the liquid crystal motherboard identical.

A cell gap at one or two sides of the display panel made by the manufacturing method of the display panel according to the embodiment of the present disclosure is different from the cell gap of other sides of the display panel, which can reduce or eliminate the difference of the display effect of the display panel.

At least one embodiment of the present disclosure further provides a display panel, the height of the supporting structure in the sealant at one side or two sides of the display panel is larger than the height of the supporting structure in the sealant at the remaining sides of the display panel, and the supporting structure is a silicon sphere. FIG. 17 and FIG. 18 illustrate the display panel according to an embodiment of the present disclosure.

What is described above is related to only the illustrative embodiments of the disclosure and not limitative to the scope of the disclosure. The scopes of the disclosure are defined by the accompanying claims.

What is claimed is:

1. A method of manufacturing a display panel, comprising:
providing a liquid crystal motherboard, the liquid crystal motherboard comprising: a first motherboard, a second motherboard, and a plurality of liquid crystal regions arranged in a matrix on the first motherboard, the plurality of liquid crystal regions comprise first liquid crystal regions adjacent to first edges of the first motherboard and a central liquid crystal region not adjacent to any edge of the first motherboard;
coating a sealant on a peripheral region of each of the liquid crystal regions of the first motherboard; and
assembling the second motherboard with the first motherboard and arranging liquid crystal in each of the liquid crystal regions to obtain the liquid crystal motherboard,
wherein the coating the sealant on the peripheral region of each of the liquid crystal regions of the first motherboard comprises:
coating only a first sealant on an entire peripheral region of the central liquid crystal region, and coating a second sealant on a peripheral region of each of the first liquid crystal regions, wherein the first sealant is provided with a first supporting structure, the second sealant is provided with a second supporting structure, and a height of the second supporting structure is larger than a height of the first supporting structure, the first sealant has a same height in the entire peripheral region of the central liquid crystal region.

2. The method according to claim 1, wherein the plurality of liquid crystal regions further comprise second liquid crystal regions, and the second liquid crystal regions are adjacent to second edges of the first motherboard intersecting with the first edges of the first motherboard, each of the first liquid crystal regions has a first distance from itself to one of the first edges of the first motherboard, and each of the second liquid crystal regions has a second distance from itself to one of the second edges of the first motherboard;
the coating the sealant on the peripheral region of each of the liquid crystal regions of the first motherboard, further comprises:
in condition that the second distance is less than the first distance, coating the first sealant on a peripheral region of each of the second liquid crystal regions;
in condition that the second distance is greater than or equal to the first distance, coating the second sealant on a peripheral region of each of the second liquid crystal regions.

3. The method according to claim 1, wherein the coating the second sealant on the peripheral region of each of the first liquid crystal regions comprises:
coating the second sealant on a first peripheral sub-region of the peripheral region of each of the first liquid crystal regions, and the first peripheral sub-region is a region, adjacent to the first edges, of the peripheral region of each of the first liquid crystal region;
coating the first sealant on a second peripheral sub-region of the peripheral region of each of the first liquid crystal regions, and the second peripheral sub-region is a remaining region of the peripheral region of each of the first liquid crystal regions except the first peripheral sub-region.

4. The method according to claim 3, wherein the second sealant in the first peripheral sub-region and the first sealant in the second peripheral sub-region form a closed structure.

5. The method according to claim 3, wherein the second sealants in the first peripheral sub-regions of all the first liquid crystal regions adjacent to the first edges are integrally formed.

6. The method according to claim 1, wherein both the first supporting structure and the second supporting structure are in shape of sphere, the height of the first supporting structure is equal to a diameter of the first supporting structure, and the height of the second supporting structure is equal to a diameter of the second supporting structure.

7. The method according to claim 6, wherein the first supporting structure or the second supporting structure comprises at least one selected from the group consisting of a silicon sphere, a plastic sphere, and a glass fiber sphere.

8. The method according to claim 1, wherein:
the height of the first supporting structure ranges from 3.6 microns to 4.4 microns; and the height of the second supporting structure ranges from 3.8 microns to 4.6 microns.

9. The method according to claim 1, wherein:
the second motherboard and the first motherboard are assembled to obtain the liquid crystal motherboard, and each of the liquid crystal regions is provided with liquid crystal, and the method further comprises:
assembling the second motherboard with the first motherboard, and the liquid crystal is arranged in each of the liquid crystal regions; and
curing the sealant.

10. The method according to claim 1, wherein after the second motherboard is assembled with the first motherboard to obtain the liquid crystal motherboard, the method further comprises:
cutting the liquid crystal motherboard along cutting lines of the liquid crystal motherboard to obtain a plurality of display panels, and orthographic projections of the cutting lines on the first motherboard are located between every two adjacent liquid crystal regions.

11. The method according to claim 1, wherein:
the first motherboard is an array motherboard, and the second motherboard is an opposing motherboard.

12. A display panel, wherein a second supporting structure is arranged in a sealant on one or two sides of the display panel, a first supporting structure is arranged in a sealant of remaining sides of the display panel, and a height of the second supporting structure is larger than a height of the first supporting structure.

13. The display panel according to claim 12, wherein the first supporting structure or the second supporting structure comprises at least one selected from the group consisting of a silicon sphere, a plastic sphere, and a glass fiber sphere.

14. The method according to claim 1, wherein the first motherboard is an opposing motherboard, and the second motherboard is an array motherboard.

15. The method according to claim 4, wherein the second sealants in the first peripheral sub-regions of all the first liquid crystal regions adjacent to the first edges are integrally formed.

* * * * *

UNITED STATES PATENT AND TRADEMARK OFFICE
CERTIFICATE OF CORRECTION

| | | |
|---|---|---|
| PATENT NO. | : 11,372,275 B2 | Page 1 of 1 |
| APPLICATION NO. | : 16/327534 | |
| DATED | : June 28, 2022 | |
| INVENTOR(S) | : Lei Zhang et al. | |

It is certified that error appears in the above-identified patent and that said Letters Patent is hereby corrected as shown below:

On the Title Page

(71) Applicants should read: BEIJING BOE OPTOELECTRONICS TECHNOLOGY CO., LTD., Beijing (CN); BOE TECHNOLOGY GROUP CO., LTD., Beijing (CN)

Signed and Sealed this
Twenty-third Day of April, 2024

Katherine Kelly Vidal
*Director of the United States Patent and Trademark Office*